(12) United States Patent
Sasaki (10) Patent No.: US 7,602,400 B2
(45) Date of Patent: Oct. 13, 2009

(54) COLOR ADJUSTING METHOD AND COLOR ADJUSTING APPARATUS

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 376 days.

(21) Appl. No.: 11/265,167

(22) Filed: Nov. 3, 2005

(65) Prior Publication Data

US 2006/0119910 A1    Jun. 8, 2006

(30) Foreign Application Priority Data

Nov. 5, 2004   (JP)   ............................. 2004-322011

(51) Int. Cl.
*G09G 5/02*    (2006.01)
*G09G 5/00*    (2006.01)
*H04N 9/64*    (2006.01)
*G03F 3/08*    (2006.01)
*G06K 9/00*    (2006.01)

(52) U.S. Cl. .................. 345/589; 345/581; 348/242; 358/518; 382/162; 382/167

(58) Field of Classification Search ............ 345/581, 345/589–593; 382/162, 167; 348/242; 358/504, 358/518, 1.9
See application file for complete search history.

(56) References Cited

U.S. PATENT DOCUMENTS

| 5,130,935 | A  | * | 7/1992 | Takiguchi ............ 382/167 |
| 5,515,172 | A  | * | 5/1996 | Shiau .................. 358/520 |
| 2003/0133609 | A1 | * | 7/2003 | Ubillos et al. ......... 382/167 |
| 2004/0057614 | A1 |   | 3/2004 | Ogatsu |

FOREIGN PATENT DOCUMENTS

| JP | A 11-143143  | 5/1999 |
| JP | A 2004-112694 | 4/2004 |

* cited by examiner

*Primary Examiner*—Xiao M Wu
*Assistant Examiner*—Tize Ma
(74) *Attorney, Agent, or Firm*—Oliff & Berridge, PLC

(57) ABSTRACT

A color adjusting method of adjusting colors of a color image. The method includes: adjusting a color of the color image by converting a value of a parameter representing a straight line passing through a color to be adjusted in a color space representing the color image.

20 Claims, 9 Drawing Sheets

REFERENCE CONVERSION
FUNCTION TO ADJUST Y

FIG. 17B

REFERENCE CONVERSION
FUNCTION TO ADJUST CbCr

COLOR ADJUSTING METHOD AND COLOR ADJUSTING APPARATUS

BACKGROUND OF THE INVENTION

1. Field of the Invention

The present invention relates to a color adjusting method and a color adjusting method of adjusting subject colors of a color image to target colors.

2. Description of the Related Art

A general method of adjusting colors of a color image is a correction method using a gamma function. If an image is expressed by R (red), G (green) and B (blue) color components, these RGB color components are corrected using a gamma function (for example, see JP-A-11-143143). Hereinafter, this correction is referred to as gamma correction.

The gamma correction allows adjustment of luminance, contrast and so on of a whole image. Since the gamma function has a smooth shape, a result of correction is smooth, a reversion of gradation does not appear, and the gradation is not lost. However, since an adjustment is performed on the whole image, only a particular color and its surrounding cannot be adjusted which is not effected by other colors.

JP-A-2004-112694 discloses a color adjusting method of adjusting a subject color of a color image to a target color, which is not effected by other colors. In this disclosure, a capsule body including a subject color to be adjusted and a target color is formed in a color space representing the color image, and a color adjustment is performed only in the capsule body. In addition, shift of the subject color to the target color is controlled so as to generate no reversion of gradation. Accordingly, it is possible to preferably adjust a blue color of the sky, a green color of trees and grass, etc., for example, which is not effected by other colors.

SUMMARY OF THE INVENTION

However, although the subject color may be changed to the target color without effecting on other colors, there arises a problem in that colors between the subject color and the target color are suddenly varied, and accordingly, gradation is extremely varied between the target color and the outline of the capsule body. In addition, when an adjustment to increase luminance is made, there is a possibility of destruction of a pattern. For example, of memorial colors, a skin area of a man is not limited to a backlight correction and its luminance is more adjusted than its chromaticity. In this case, a technique disclosed in JP-A-2004-112694 has a possibility that gradation loss in the luminance is conspicuous although the chromaticity is preferably adjusted.

The invention may provide a color adjusting method of adjusting colors of a color image, including: adjusting a color of the color image by converting a value of a parameter representing a straight line passing through a color to be adjusted in a color space representing the color image.

The invention may provide a color adjusting method of adjusting colors of a color image, including: setting a straight line, which is a reference in a color space representing the color image, as a reference straight line; setting a function to convert a value of a parameter representing the reference straight line as a reference conversion function; calculating a first color adjustment amount for a color to be adjusted in the color space using the reference conversion function; calculating a control distance, which is a distance between the color to be adjusted and the reference straight line; calculating a second color adjustment amount from the control distance and the first color adjustment amount; and performing a color adjustment for the color to be adjusted using the second color adjustment amount.

The invention may provide a color adjusting apparatus for adjusting colors of a color image, including: a parameter converting unit that converts a value of a parameter representing a straight line passing through a color to be adjusted in a color space representing the color image, wherein a color adjustment of the color image is performed by converting the parameter in the parameter converting unit.

The invention may include a color adjusting apparatus for adjusting colors of a color image, including: a first color adjustment amount calculating unit configured to set a straight line, which is a reference in a color space representing the color image, as a reference straight line, to set a function to convert a value of a parameter representing the reference straight line as a reference conversion function, and to calculate a first color adjustment amount for a color to be adjusted in the color space using the reference conversion function; a control distance calculating unit configured to calculate a control distance, which is a distance between the color to be adjusted and the reference straight line; a second color adjustment amount calculating unit configured to calculate a second color adjustment amount from the control distance t and the first color adjustment amount; and a color adjusting unit configured to perform a color adjustment for the color to be adjusted using the second color adjustment amount.

BRIEF DESCRIPTION OF THE DRAWINGS

Embodiments may be described in detail with reference to the accompanying drawings, in which.

DETAILED DESCRIPTION OF THE INVENTION

Figure 1:
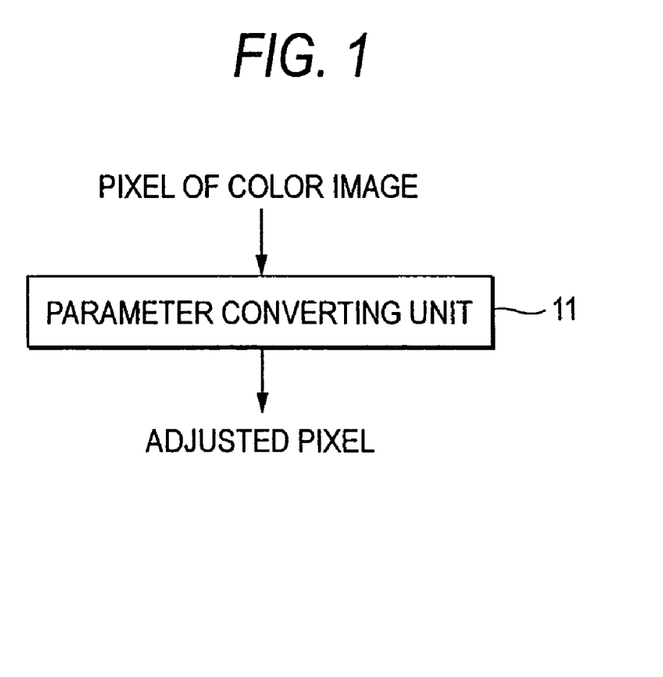
FIG. 1 is a block diagram illustrating a first embodiment.

Hereinafter, exemplary embodiments of the present invention will be described with reference to the accompanying drawings. FIG. 1 is a block diagram illustrating a first embodiment of the present invention. In the first embodiment, a process as a basis of color adjustment in the present invention will be described. That is, a basic process of the present invention is to prepare a straight line in a color space representing a color image and perform a color adjustment by converting parameters of a function representing this straight line. For example, assuming that a color adjustment space is a RGB space, a point (R, G, B) on the straight line directing from a point $(R_0, G_0, B_0)$ to a point $(R_T, G_T, B_T)$ can be expressed as follows.

$$R = R_0 + a_R t$$

$$G = G_0 + a_G t$$

$$B = B_0 + a_B t$$

Where, $(a_R, a_G, a_B)$ is a direction vector and can be expressed as follows.

$$a_R = R_T - R_0$$

$$a_G = G_T - G_0$$

$$a_B = B_T - B_0$$

t is a parameter representing a position of a point on the straight line. It is assumed that $(R, G, B) = (R_0, G_0, B_0)$ when $t=0$, and $(R, G, B) = (R_T, G_T, B_T)$ when $t=T$.

Figure 2:
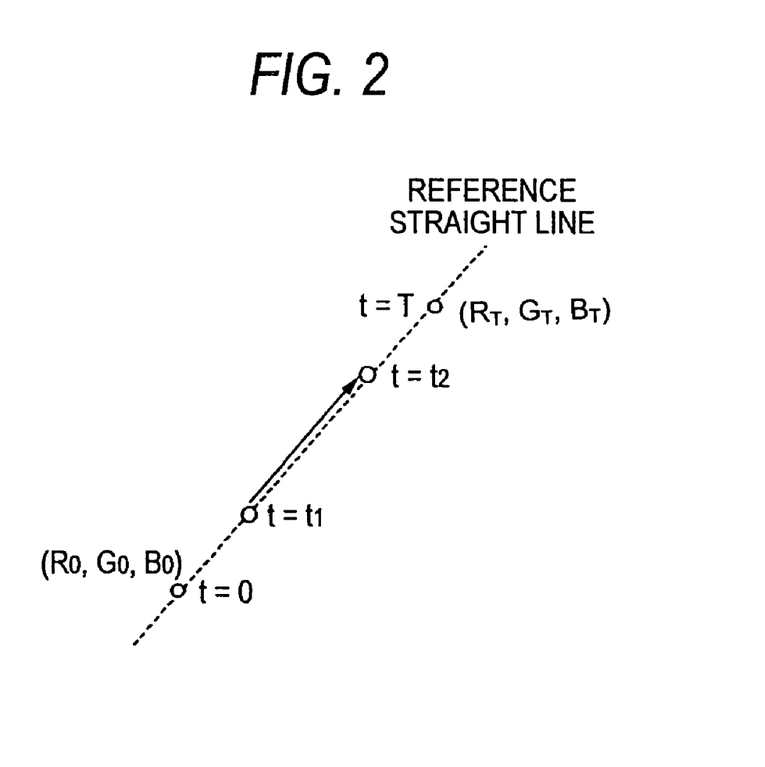
FIG. 2 is a schematic view illustrating a color adjustment using parameters.

A parameter converting unit 11 shown in FIG. 1 performs a color adjustment by conversion of parameters. For example, FIG. 2 shows a form of shift of a point $(R_1, G_1, B_1)$ between the point $(R_0, G_0, B_0)$ and the point $(R_T, G_T, B_T)$ to a point $(R_2, G_2, B_2)$. In FIG. 2, a chain line is a straight line set in the color space and represents that a color at $t=t_1$ is converted to a color at $t=t_2$ between $t=0$ and $t=T$.

Figure 3:
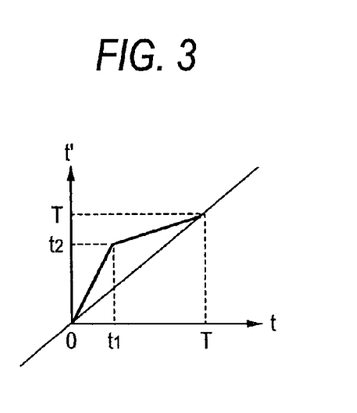
FIG. 3 is a diagram showing an exemplary conversion function of parameters for making an adjustment without gradation reversion.
Figure 4:
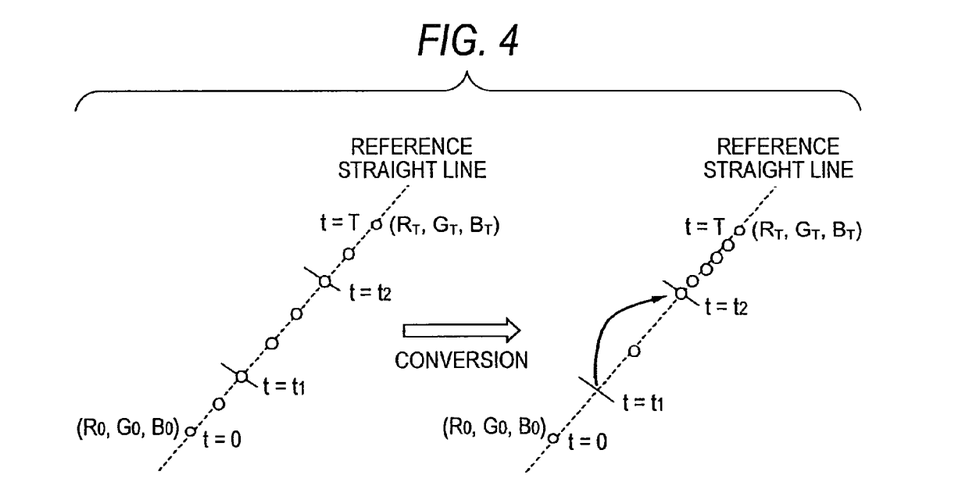
FIG. 4 is a schematic view illustrating shift of points on a straight line.

In addition, FIG. 3 shows an exemplary conversion function of parameters for making an adjustment to generate no gradation reversion. By using the conversion function shown in FIG. 3, the point $(R_1, G_1, B_1)$ can be converted to the point $(R_2, G_2, B_2)$, and also, conversion with no gradation reversion can be performed. Here, when $t=0$ and $t=T$, since a point is shifted to the point itself, the shift of point on the straight line is as shown in FIG. 4.

As can be seen from a form of the conversion function shown in FIG. 3, the gradation may be scattered for some patterns in a range of $t=t_1$ to T. In this case, it is preferable to use a smooth and differentiable function shown in FIG. 5, not a function having a non-differentiable point shown in FIG. 3.

Figure 5:
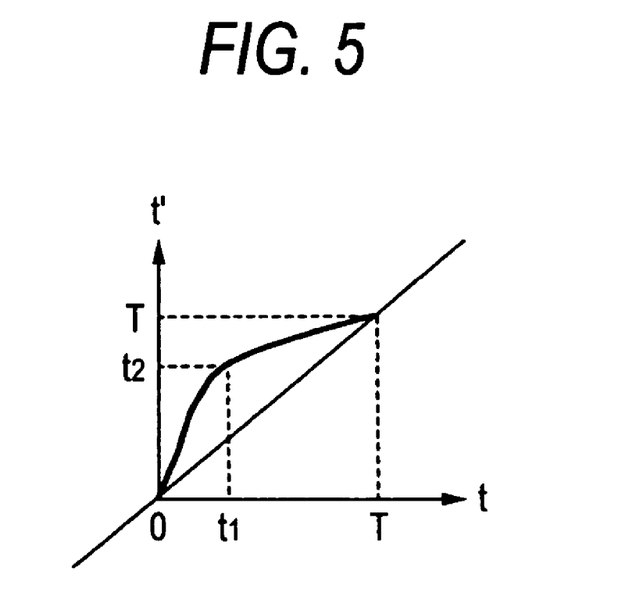
FIG. 5 is a diagram illustrating an exemplary smooth conversion function.
Figure 6:
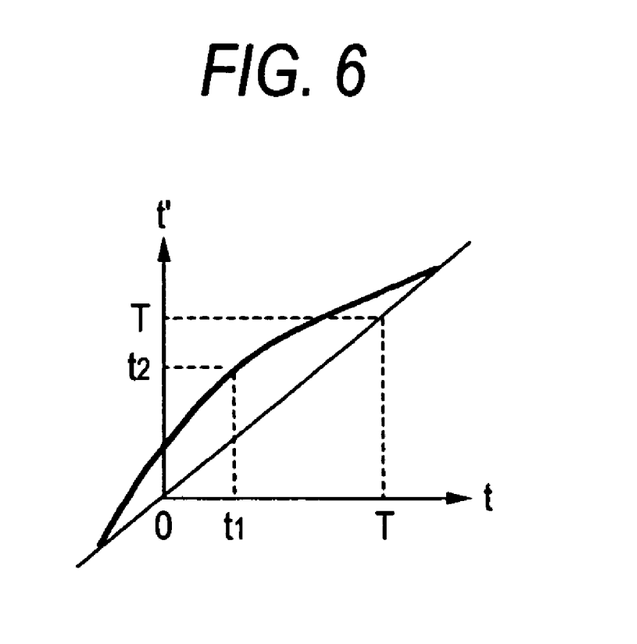
FIG. 6 is a diagram showing an example of enlarging the width of a conversion function.

In addition, although the conversion function shown in FIG. 5 is a function that a point is shifted to the point itself when $t=0$ and $t=T$, a color adjustment may be performed with good gradation by increasing the width to some extent, as shown in FIG. 6. While the RGB space has been illustrated in the first embodiment, the present invention is applicable to all color spaces, such as a CMYK space, a device-independent L*a*b space, an YCbCr space, etc., irrespective of dimension.

Figure 7:
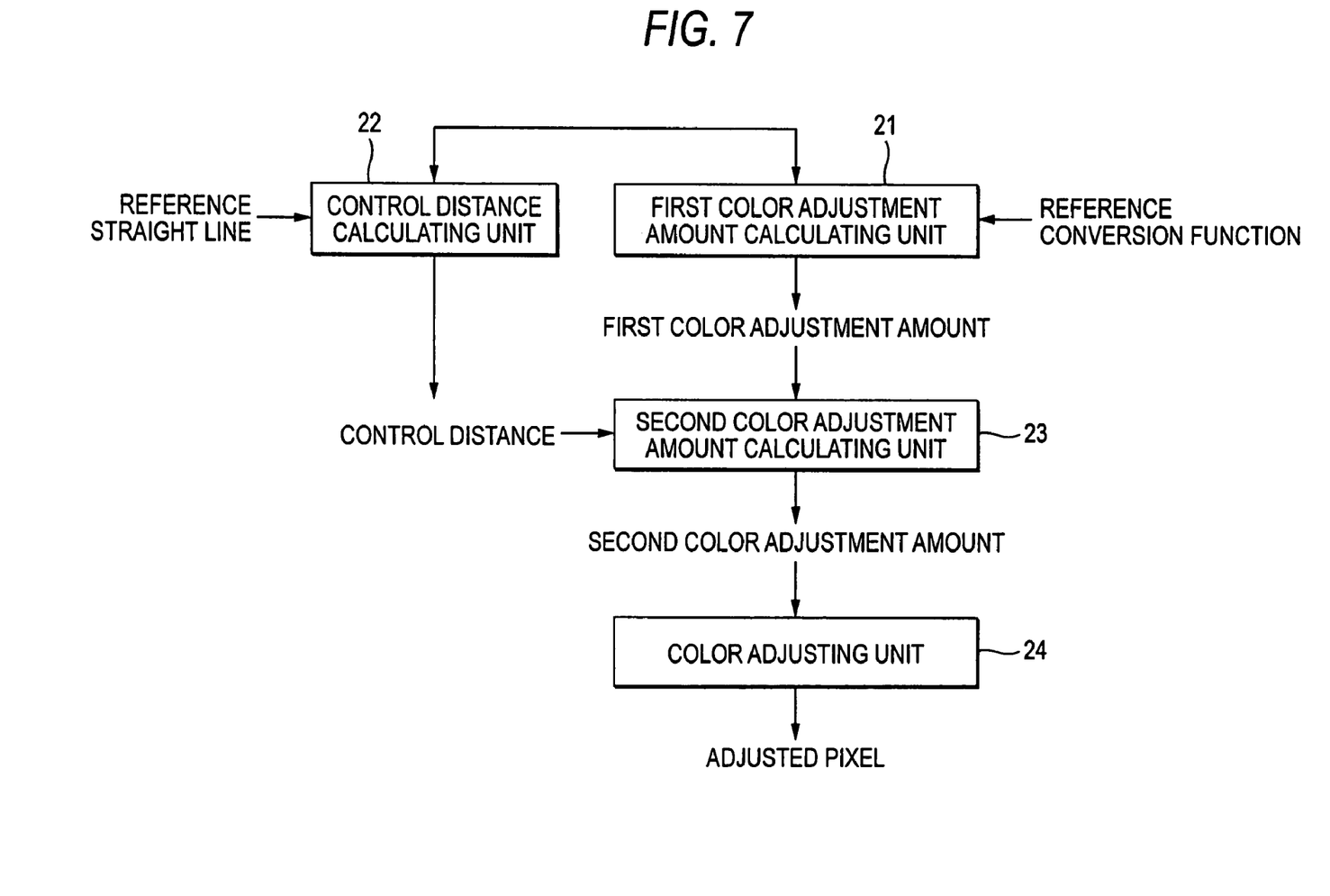
FIG. 7 is a block diagram illustrating a second embodiment.

FIG. 7 is a block diagram illustrating a second embodiment of the present invention. The second embodiment is characterized in that an adjustment of a subject color to a target color of a color image is performed without effecting on other colors, with no gradation reversion, and without gradation loss, using the basic process shown in FIG. 1.

A first color adjustment amount calculating unit 21 calculates a first color adjustment amount for colors of each pixel of a color image using a reference conversion function. Here, the reference conversion function is determined by the subject color and the target color and is the reference conversion function as shown in FIG. 5 or 6 in the first embodiment. That is, in the reference conversion function in the second embodiment, the subject color corresponds to when $t=t_1$ and the target color corresponds to when $t=t_2$ in FIGS. 5 and 6.

In the present invention, a straight line connecting the subject color to the target color is referred to as a reference straight line. The reference straight line may be represented by a straight line connecting the subject line to the target line using parameters, as in the first embodiment.

Figure 8:
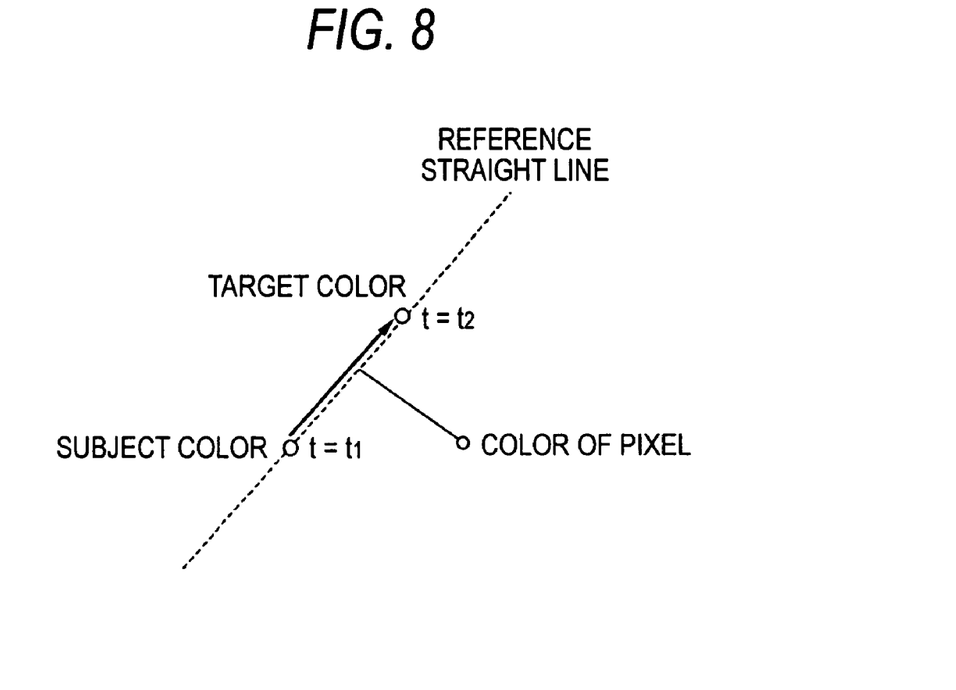
FIG. 8 is a schematic view illustrating a relationship between a reference straight line and a color of a pixel.
Figure 9:
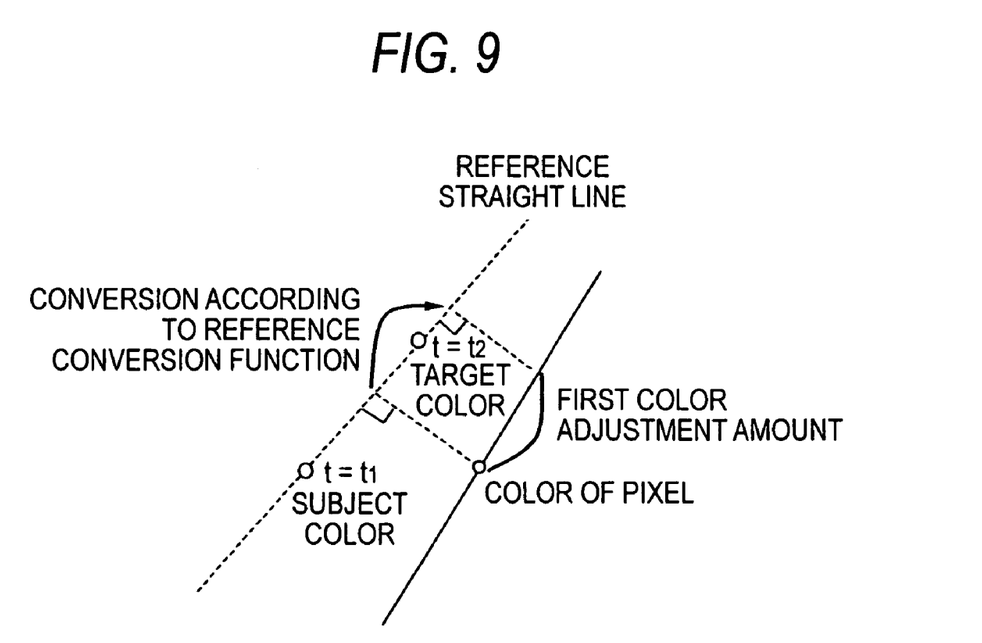
FIG. 9 is a schematic view illustrating first color adjustment amount.

A color of a particular pixel of a color image may be assigned with a parameter by describing a line perpendicular to the reference straight line, as shown in FIG. 8. After assigning the parameter, the first color adjustment amount is calculated, as shown in FIG. 9, using the reference conversion function as shown in FIGS. 5 and 6. That is, the first color adjustment amount is a value of a converted parameter obtained from conversion of a parameter, which is obtained by projecting the subject color of the pixel onto the reference straight line, using the reference conversion function.

Figure 10:
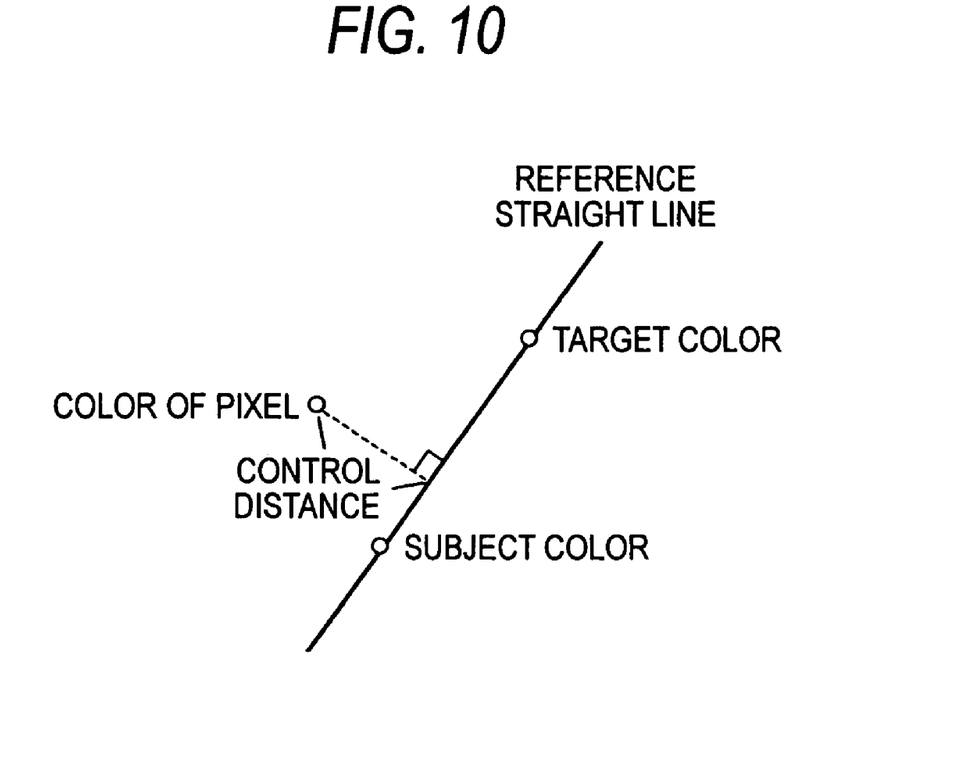
FIG. 10 is a schematic view illustrating a control distance.

A control distance calculating unit 22 shown in FIG. 7 calculates a control distance from a color of a pixel of a color image to the reference straight line in a color space. The control distance may be the shortest distance from a point representing the color of the pixel of the color image to the reference straight line in the color space, as shown in FIG. 10.

A second color adjustment amount calculating unit 23 shown in FIG. 7 calculates a second color adjustment amount using the first color adjustment amount calculated in the first color adjustment amount calculating unit 21 and the control distance calculated in the control distance calculating unit 22. Specifically, by performing a process of making color adjustment amount (second color adjustment amount) small as a subject color to be adjusted becomes distant from the reference straight line on the basis of the first color adjustment amount, colors other than the subject color are not affected by the color adjustment.

Such a process may be performed according to the following flow, for example. Assuming that the control distance is d, a weight w of the control distance d is calculated by using the following equation, for example.

$$w = 1/1 + (d/d_{inf})^p$$

Figure 11:
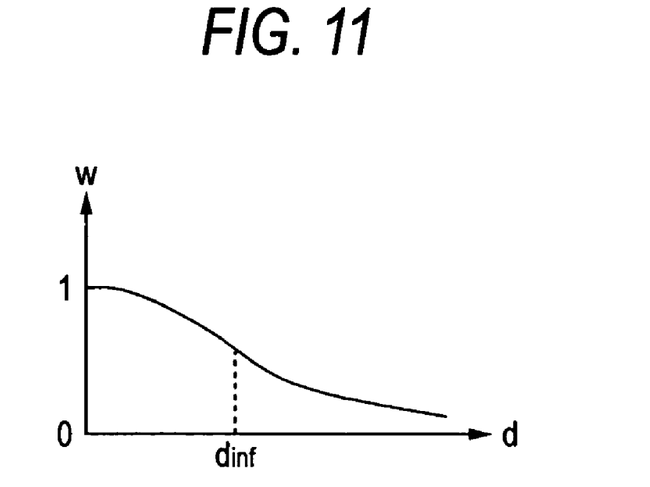
FIG. 11 is a diagram showing an example of a relationship between a control distance d and a weight w.

A function represented by Equation 3 is shown in FIG. 11. $d_{inf}$ is a parameter to control an inflection point of the function, and p is a parameter to control the maximum gradient. Assuming that the first color adjustment amount is $D_1$ and the second color adjustment amount is $D_2$, the second color adjustment amount is $D_2$ can be expressed by the following equation.

$$D_2 = w D_1$$

Figure 12:
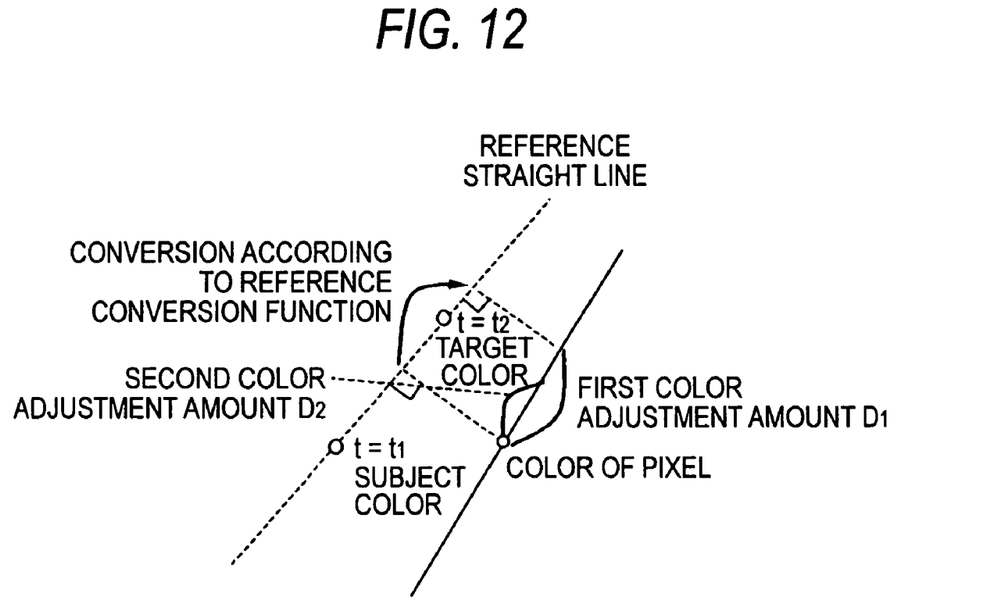
FIG. 12 is a schematic view illustrating a relationship between first color adjustment amount and second color adjustment amount.

FIG. 12 shows a relationship between the first color adjustment amount and the second color adjustment amount. The first color adjustment amount $D_1$ corresponds to adjustment amount on the reference straight line, and, on the contrary, the second color adjustment amount $D_2$ has a weight w corresponding to a distance between a subject color of a pixel and the reference straight line (the control distance), and accordingly, becomes small since the weight w becomes small as the subject color becomes distant from the reference straight line.

A color adjusting unit 24 shown in FIG. 7 performs a color adjustment using the second color adjustment amount. By using the second color adjustment amount, a color adjustment may be made without having an effect on colors other than the subject color.

Figure 13:
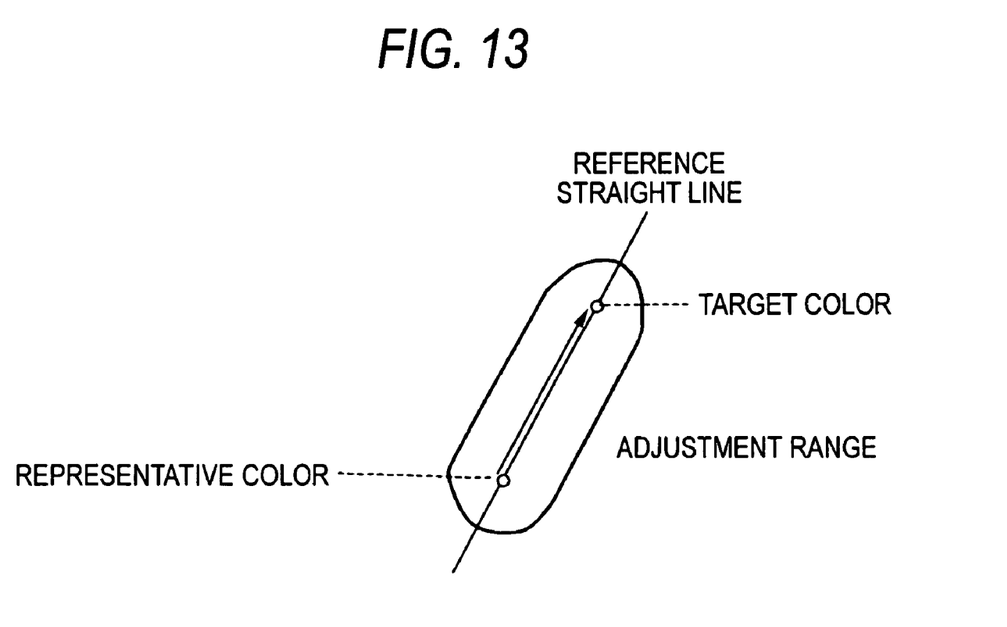
FIG. 13 is a schematic view illustrating a range of a solid body having an outline parallel to a reference straight line.

In addition, as shown in FIG. 13, when a color adjustment is to be performed in only a range of a solid body having an outline parallel to the reference straight line, $d_{inf}$ in Equation 3 has only to be used as an integer.

Figure 14:
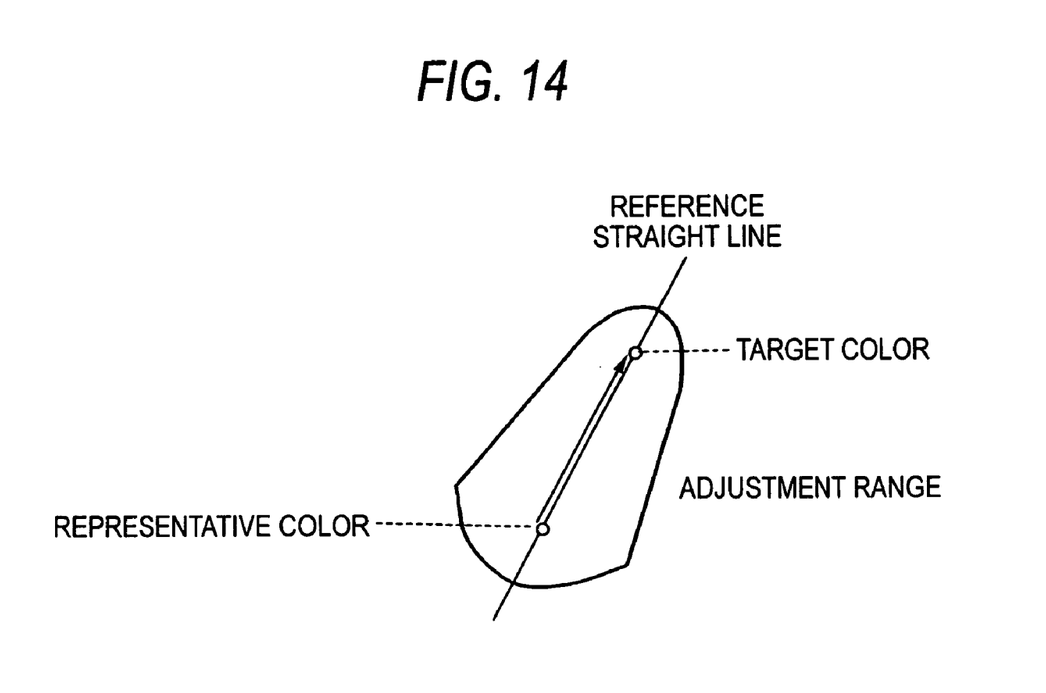
FIG. 14 is a schematic view illustrating an outline to make the surrounding of a subject color wider than the surrounding of a target color.
Figure 15:
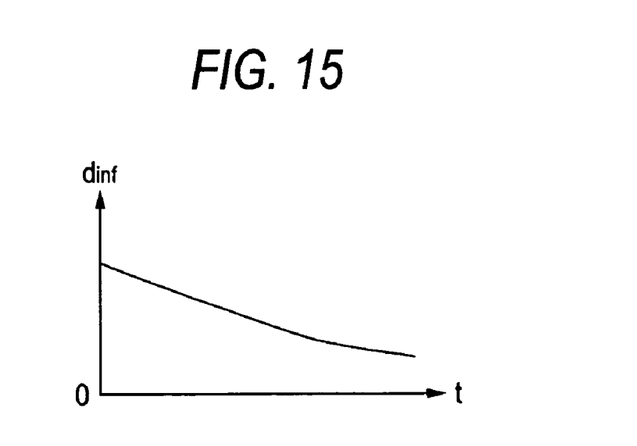
FIG. 15 is a graph showing a relationship between a parameter t on a reference straight line and an inflection point of a function.

In addition, as shown in FIG. 14, when a color adjustment is to be performed in a range of a solid body having an outline to make the surrounding of the subject color wider than the surrounding of the target color, $d_{inf}$ in Equation 3 may be represented by a function of changing $d_{int}$ using a value of t, that is, a function having a form as shown in FIG. 15. The change of range of the outline or $d_{int}$ by the value of t may be properly made by a position of the subject color in a color space, direction of the reference straight line, etc. Accordingly, it is possible to obtain natural gradation variation for image data after color adjustment.

In a third embodiment of the present invention, a color space to reproduce a color image is represented by luminance and chromaticity, as in an L*a*b space or an YCbCr space, not color components.

Figure 16:
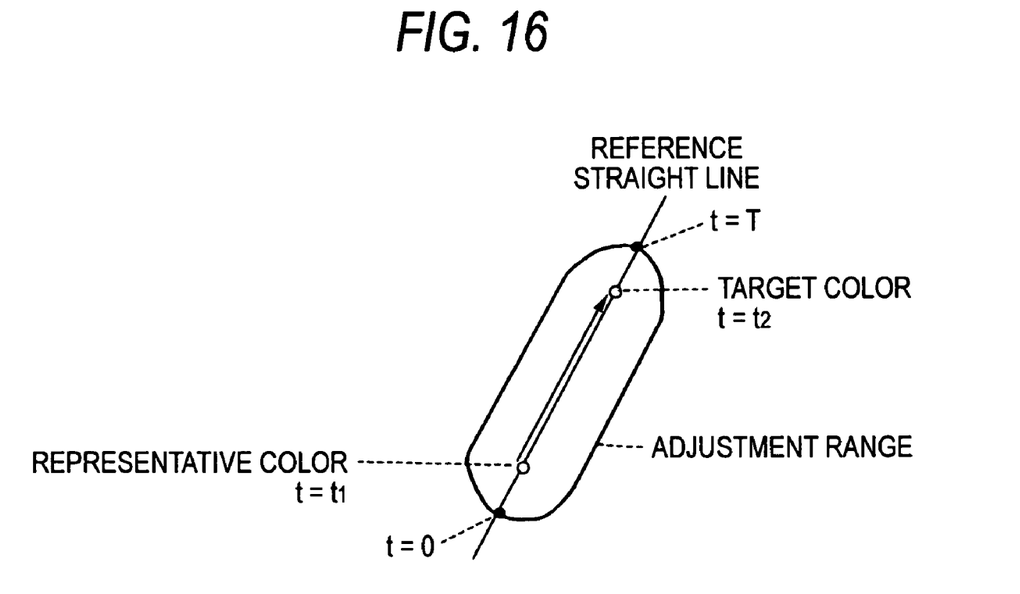
FIG. 16 is a schematic view illustrating an adjustment of a subject color to a target color in an YCbCr space.

FIG. 16 is a schematic view illustrating an adjustment of a subject color to a target color in an YCbCr space. Assuming that the subject color is $(Y_1, Cb_1, Cr_1)$, the target color is $(Y_2, Cb_2, Cr_2)$, a point at t=0 is $(Y_0, Cb_0, Cr_0)$, and a point at t=T is $(Y_T, Cb_T, Cr_T)$, the reference straight line can be expressed as follows by using the parameter t, as in the first embodiment.

$Y=Y_0+a_y t$ $Cb=Cb_0+a_{Cb} t$ $Cr=Cr_0+a_{Cr} t$

A direction vector $(a_y, a_{Cb}, a_{Cr})$ is similar to the direction vector in the first embodiment.

Figure 17A:
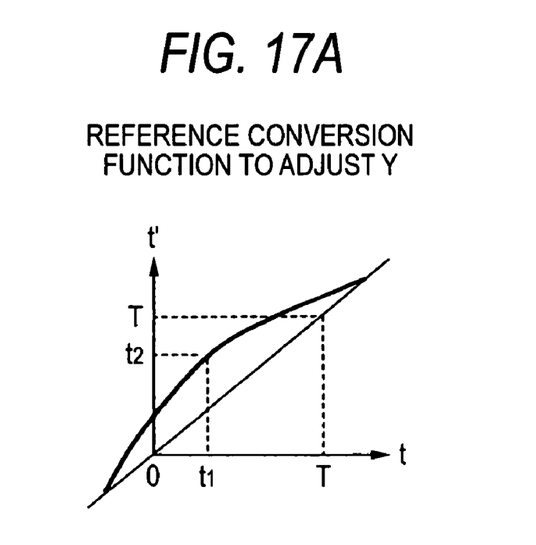
FIGS. 17A and 17B are diagrams showing a difference between a reference conversion function for luminance and a reference conversion function for chromaticity.
Figure 17B:
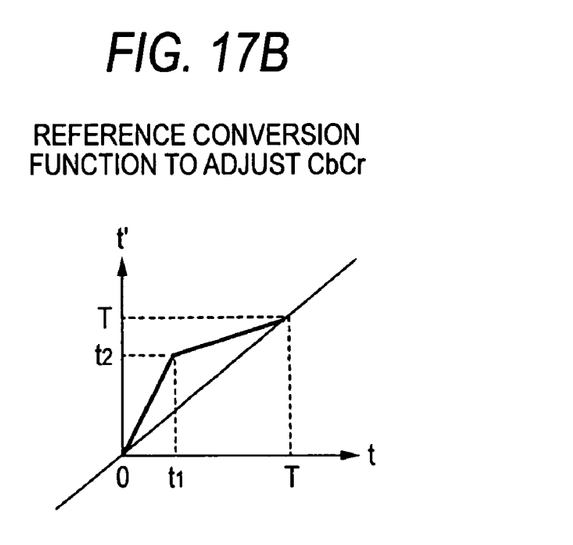

In general, it is known that chromaticity is sensitive to conversion of luminance when a user sees an image. Particularly, if a difference in luminance between a subject color and a target color is large, a color is apparently blurred although gradation reversion in a color space does not appear when the conversion function shown in FIG. 3 is employed. In such a case, it is preferable to divide the reference conversion function into luminance and chromaticity, as shown in FIGS. 17A and 17B. FIG. 17A shows an example of the reference conversion function for adjusting the luminance and FIG. 17B shows an example of the reference conversion function for adjusting the chromaticity. There is provided an effective adjustment method when gradation of the luminance is not scattered and the chromaticity has little effect on colors other than the subject color. The color adjustment amount may be the same amount as the amount in the second embodiment.

In addition, if different reference conversion function are used for the luminance and the chromaticity, a chromaticity adjustment may be made using reference conversion function related to the chromaticity after a luminance adjustment is performed using a reference conversion function related to the luminance, or, on the contrary, the luminance adjustment may be made using the reference conversion function related to the luminance after the chromaticity adjustment is performed using a reference conversion function related to the chromaticity. Particularly, when the chromaticity adjustment is performed after the luminance adjustment is performed, it is possible to make a color adjustment sensitive to the human eye.

In addition, it is possible to implement the above-described color adjusting method and the above-described color adjusting apparatus as programs executed in devices or computers that deal with image data. For example, the color adjusting method and the color adjusting apparatus according to the present invention are applicable when a particular color adjustment is performed by an image input device such as a digital camera, or when a particular color adjustment is performed from image data as one function in graphic software.

As described above, the embodiments of the invention provides a color adjusting method of adjusting colors of a color image. A color adjustment of the color image is performed by converting a value of a parameter representing a straight line passing through a color to be adjusted in a color space representing the color image.

With this configuration, in adjusting a color to be adjusted in a color space to a target color, since the color adjustment of the color image is made by setting a parameter representing a straight line passing through the color to be adjusted and converting a value of the parameter, it is possible to make a required color adjustment without having an effect on colors other than the color to be adjusted and its surrounding.

In addition, the embodiments of the invention provides a color adjusting method of adjusting colors of a color image, including the steps of setting a straight line, which is a reference in a color space representing the color image, as a reference straight line and setting a function to convert a value of a parameter representing the reference straight line as a reference conversion function, calculating first color adjustment amount for a color to be adjusted in the color space using the reference conversion function, calculating a control distance, which is a distance between the color to be adjusted and the reference straight line, calculating second color adjustment amount from the control distance and the first color adjustment amount, and performing a color adjustment for the color to be adjusted using the second color adjustment amount.

With this configuration, in adjusting a color to be adjusted in a color space to a target color, since a reference conversion function to convert a parameter representing a reference straight line set in the color space is set, first color adjustment amount is calculated using the reference conversion function, second color adjustment amount is calculated by adjusting the first color adjustment amount by a distance between the reference straight line and the color to be adjusted, and a color adjustment is performed using the second color adjustment amount, it is possible to make a color adjustment without gradation reversion or gradation collapse for neighboring colors centered on the reference straight line.

In addition, the embodiments of the invention provides a color adjusting apparatus for adjusting colors of a color image, including a parameter converting unit for converting a value of a parameter representing a straight line passing through a color to be adjusted in a color space representing the color image. A color adjustment of the color image is performed by converting the parameter in the parameter converting unit.

With this configuration, in adjusting a color to be adjusted in a color space to a target color, since the parameter converting unit sets a parameter representing a straight line passing through the color to be adjusted and the color adjustment of the color image is performed by converting a value of the parameter, it is possible to make a required color adjustment without having an effect on colors other than the color to be adjusted and its surrounding.

In addition, the embodiments of the invention provides a color adjusting apparatus for adjusting colors of a color image, including a first color adjustment amount calculating unit for setting a straight line, which is a reference in a color space representing the color image, as a reference straight line, setting a function to convert a value of a parameter representing the reference straight line as a reference conversion function, and calculating first color adjustment amount for a color to be adjusted in the color space using the reference conversion function, a control distance calculating unit for calculating a control distance, which is a distance between the color to be adjusted and the reference straight line, a second color adjustment amount calculating unit for calculating second color adjustment amount from the control distance calculated in the control distance calculating unit and the first color adjustment amount calculated in the first color adjustment calculating unit, and a color adjusting unit for performing a color adjustment for the color to be adjusted using the second color adjustment amount calculated in the second color adjustment amount calculating unit.

With this configuration, in adjusting a color to be adjusted in a color space to a target color, since the first color adjustment amount calculating unit sets a reference conversion function to convert a parameter representing a reference straight line set in the color space, first color adjustment amount is calculated using the reference conversion function, the second color adjustment amount calculating unit calculates a second color adjustment amount by adjusting the first color adjustment amount by a distance between the reference straight line and the color to be adjusted, and a color adjustment is performed using the second color adjustment amount, it is possible to make a color adjustment without gradation reversion or gradation collapse for neighboring colors centered on the reference straight line.

According to the embodiments of the invention, when a subject color of a color image is adjusted to a target color, it is possible to perform a color adjustment without having an effect on colors other than the subject color and its surrounding, without gradation reversion and gradation collapse.

The entire disclosure of Japanese Patent Application No. 2004-322011 filed on Nov. 5, 2004 including its specification, claims, drawings and abstract is incorporated herein by reference in its entirety.

[FIG. 1]
A: PIXEL OF COLOR IMAGE
11: PARAMETER CONVERTING UNIT
B: ADJUSTED PIXEL
[FIG. 2]
A: REFERENCE STRAIGHT LINE
[FIG. 4]
A: REFERENCE STRAIGHT LINE
B: CONVERSION
[FIG. 7]
A: REFERENCE STRAIGHT LINE
22: CONTROL DISTANCE CALCULATING UNIT
B: CONTROL DISTANCE
21: FIRST COLOR ADJUSTMENT AMOUNT CALCULATING UNIT
C: REFERENCE CONVERSION FUNCTION
D: FIRST COLOR ADJUSTMENT AMOUNT
23: SECOND COLOR ADJUSTMENT AMOUNT CALCULATING UNIT
E: SECOND COLOR ADJUSTMENT AMOUNT
24: COLOR ADJUSTING UNIT
F: ADJUSTED PIXEL
[FIG. 8]
A: REFERENCE STRAIGHT LINE
B: TARGET COLOR
C: SUBJECT COLOR
D: COLOR OF PIXEL
[FIG. 9]
A: REFERENCE STRAIGHT LINE
B: CONVERSION ACCORDING TO REFERENCE CONVERSION FUNCTION
C: TARGET COLOR
D: SUBJECT COLOR
E: FIRST COLOR ADJUSTMENT AMOUNT
F: COLOR OF PIXEL
[FIG. 10]
A: REFERENCE STRAIGHT LINE
B: TARGET COLOR
C: COLOR OF PIXEL
D: CONTROL DISTANCE
E: SUBJECT COLOR
[FIG. 12]
A: REFERENCE STRAIGHT LINE
B: CONVERSION ACCORDING TO REFERENCE CONVERSION FUNCTION
C: TARGET COLOR
D: SECOND COLOR ADJUSTMENT AMOUNT
E: SUBJECT COLOR
F: FIRST COLOR ADJUSTMENT AMOUNT
G: COLOR OF PIXEL
[FIG. 13]
A: REFERENCE STRAIGHT LINE
B: TARGET COLOR
C: REPRESENTATIVE COLOR
D: ADJUSTMENT RANGE
[FIG. 14]
A: REFERENCE STRAIGHT LINE
B: TARGET COLOR
C: REPRESENTATIVE COLOR
D: ADJUSTMENT RANGE
[FIG. 16]
A: REFERENCE STRAIGHT LINE
B: TARGET COLOR
C: REPRESENTATIVE COLOR
D: ADJUSTMENT RANGE
[FIG. 17A]
A: REFERENCE CONVERSION FUNCTION TO ADJUST Y
[FIG. 17B]
B: REFERENCE CONVERSION FUNCTION TO ADJUST CbCr

What is claimed is:

1. A color adjusting method of adjusting colors of a color image, comprising:
adjusting a predetermined adjustment range of a color of the color image using a processor by converting a value of a parameter representing a straight line passing through a useful adjustment range of a color to be adjusted in a color space representing the color image, the predetermined adjustment range including and being larger than the useful adjustment range such that a lowest value of the useful adjustment range becomes a non-zero value after the adjustment; and
outputting an adjusted color to an output device,
wherein luminance of the color image is adjusted by a smooth curvature reference conversion function, and chromaticity of the color image is adjusted by a non-curvature reference conversion function.

2. The color adjusting method of claim 1, wherein the color space representing the color image is represented by luminance and chromaticity, the conversion function for the luminance is a differentiable function representing a smooth curve, and the conversion function for the chromaticity is a function having a non-differentiable point.

3. A color adjusting method of adjusting colors of a color image, comprising:
using a processor to perform:
setting a straight line, which is a reference in a color space representing the color image, as a reference straight line, that passes through a useful adjustment range;
setting a function to convert a value of a parameter representing the reference straight line as a reference conversion function;
calculating a first color adjustment amount for a color to be adjusted in the color space using the reference conversion function, the first color adjustment amount being over a predetermined adjustment range including and being larger than the useful adjustment range such that a lowest value of the useful adjustment range becomes a non-zero value after a color adjustment,
calculating a control distance, which is a distance between the color to be adjusted and the reference straight line;
calculating a second color adjustment amount from the control distance and the first color adjustment amount; and
performing the color adjustment for the color to be adjusted using the second color adjustment amount; and
outputting an adjusted color to an output device,
wherein the color space representing the color image is represented by luminance and chromaticity; and
luminance of the color image is adjusted by a smooth curvature reference conversion function, and chromaticity of the color image is adjusted by a non-curvature reference conversion function.

4. The color adjusting method according to claim 3, wherein the reference straight line is a straight line directing from a subject color to be adjusted to a target color as a target of adjustment.

5. The color adjusting method according to claim 3, wherein the reference conversion function is a function to convert a value of a parameter representing the subject color to be adjusted in the reference straight line to a value of a parameter representing the target color as the target of adjustment and generate no gradation reversion of color.

6. The color adjusting method according to claim 3, wherein the second color adjustment amount becomes smaller as the control distance becomes larger.

7. The color adjusting method according to claim 3, wherein the reference conversion function for the luminance and the reference conversion function for the chromaticity are different from each other.

8. The color adjusting method according to claim 3, wherein the performing step includes performing a color adjustment for the luminance and then performing a color adjustment for the chromaticity.

9. The color adjusting method according to claim 3, wherein the performing step includes performing a color adjustment for the chromaticity and then performing a color adjustment for the luminance.

10. The color adjusting method of claim 3, wherein the conversion function for the luminance is a differentiable function representing a smooth curve, and the conversion function for the chromaticity is a function having a non-differentiable point.

11. A color adjusting apparatus for adjusting colors of a color image, comprising:
a parameter converting unit that adjusts a predetermined adjustment range of a color of the color image by converting a value of a parameter representing a straight line passing through a useful adjustment range of a color to be adjusted in a color space representing the color image, the predetermined adjustment range including and being larger than the useful adjustment range such that a lowest value of the useful adjustment range becomes a non-zero value after adjustment,
wherein a color adjustment of the color image is performed by converting the parameter in the parameter converting unit, and
wherein luminance of the color image is adjusted by a smooth curvature reference conversion function, and chromaticity of the color image is adjusted by a non-curvature reference conversion function.

12. The color adjusting method of claim 11, wherein the color space representing the color image is represented by luminance and chromaticity, the conversion function for the luminance is a differentiable function representing a smooth curve, and the conversion function for the chromaticity is a function having a non-differentiable point.

13. A color adjusting apparatus for adjusting colors of a color image, comprising:
a first color adjustment amount calculating unit configured to set a straight line, which is a reference in a color space representing the color image, as a reference straight line, that passes through a useful adjustment range, to set a function to convert a value of a parameter representing the reference straight line as a reference conversion function, and to calculate a first color adjustment amount for a color to be adjusted in the color space using the reference conversion function, the first color adjustment amount being over a predetermined adjustment range including and being larger than the useful adjustment range such that a lowest value of the useful adjustment range becomes a non-zero value after a color adjustment;
a control distance calculating unit configured to calculate a control distance, which is a distance between the color to be adjusted and the reference straight line;
a second color adjustment amount calculating unit configured to calculate a second color adjustment amount from the control distance t and the first color adjustment amount; and
a color adjusting unit configured to perform the color adjustment for the color to be adjusted using the second color adjustment amount,
wherein the color space representing the color image is represented by luminance and chromaticity; and
luminance of the color image is adjusted by a smooth curvature reference conversion function, and chromaticity of the color image is adjusted by a non-curvature reference conversion function.

14. The color adjusting apparatus according to claim 13, wherein the reference straight line is a straight line directing from a subject color to be adjusted to a target color as a target of adjustment.

15. The color adjusting apparatus according to claim 13, wherein the reference conversion function is a function to convert a value of a parameter representing the subject color to be adjusted in the reference straight line to a value of a parameter representing the target color as the target of adjustment and generate no gradation reversion of color.

16. The color adjusting apparatus according to claim 13, wherein the second color adjustment amount gets smaller as the control distance gets larger.

17. The color adjusting apparatus according to claim 13, wherein the reference conversion function for the luminance is different from the reference conversion function for the chromaticity.

18. The color adjusting apparatus according to claim 13, wherein the color adjusting unit performs a color adjustment for the luminance and then performs a color adjustment for the chromaticity.

19. The color adjusting apparatus according to claim 13, wherein the color adjusting unit performs a color adjustment for the chromaticity and then performs a color adjustment for the luminance.

20. The color adjusting method of claim 13, wherein the conversion function for the luminance is a differentiable function representing a smooth curve, and the conversion function for the chromaticity is a function having a non-differentiable point.

* * * * *